Jan. 4, 1966  R. E. ENGLAND  3,227,291
AUTOMATIC DIELECTRIC BONDING DIE EJECTION SYSTEM
Filed April 8, 1963  5 Sheets-Sheet 2
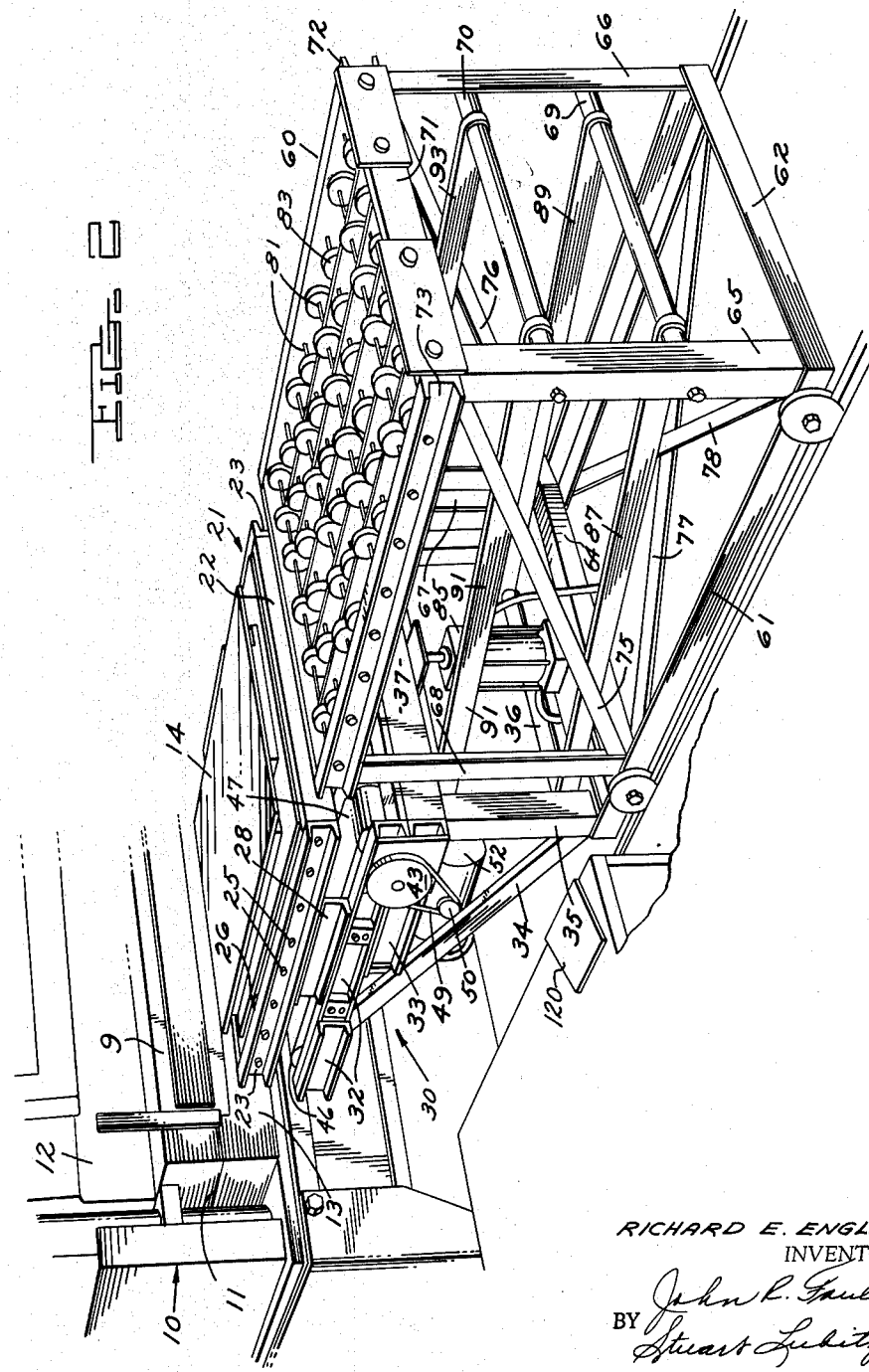
RICHARD E. ENGLAND
INVENTOR.
BY
ATTORNEYS

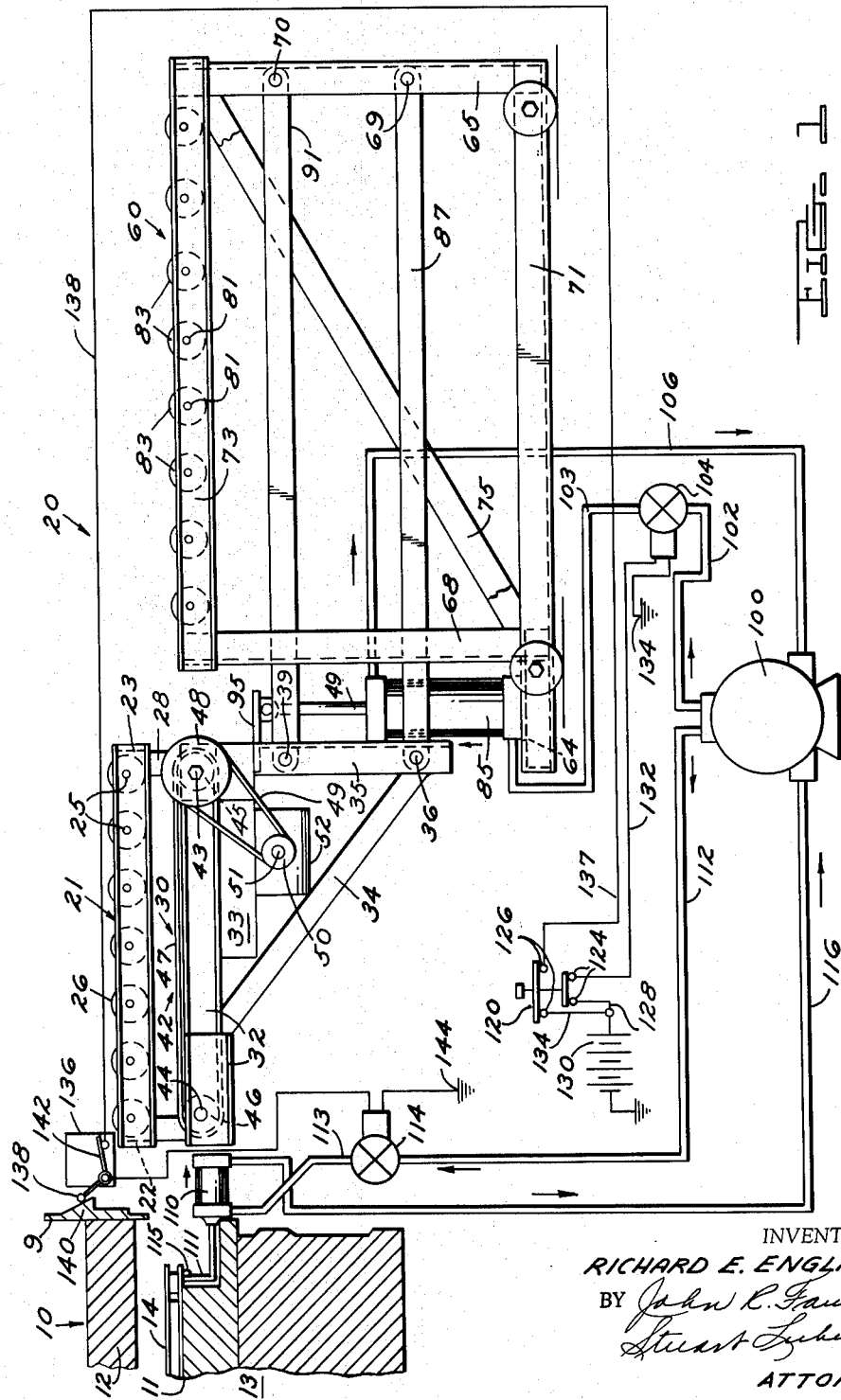

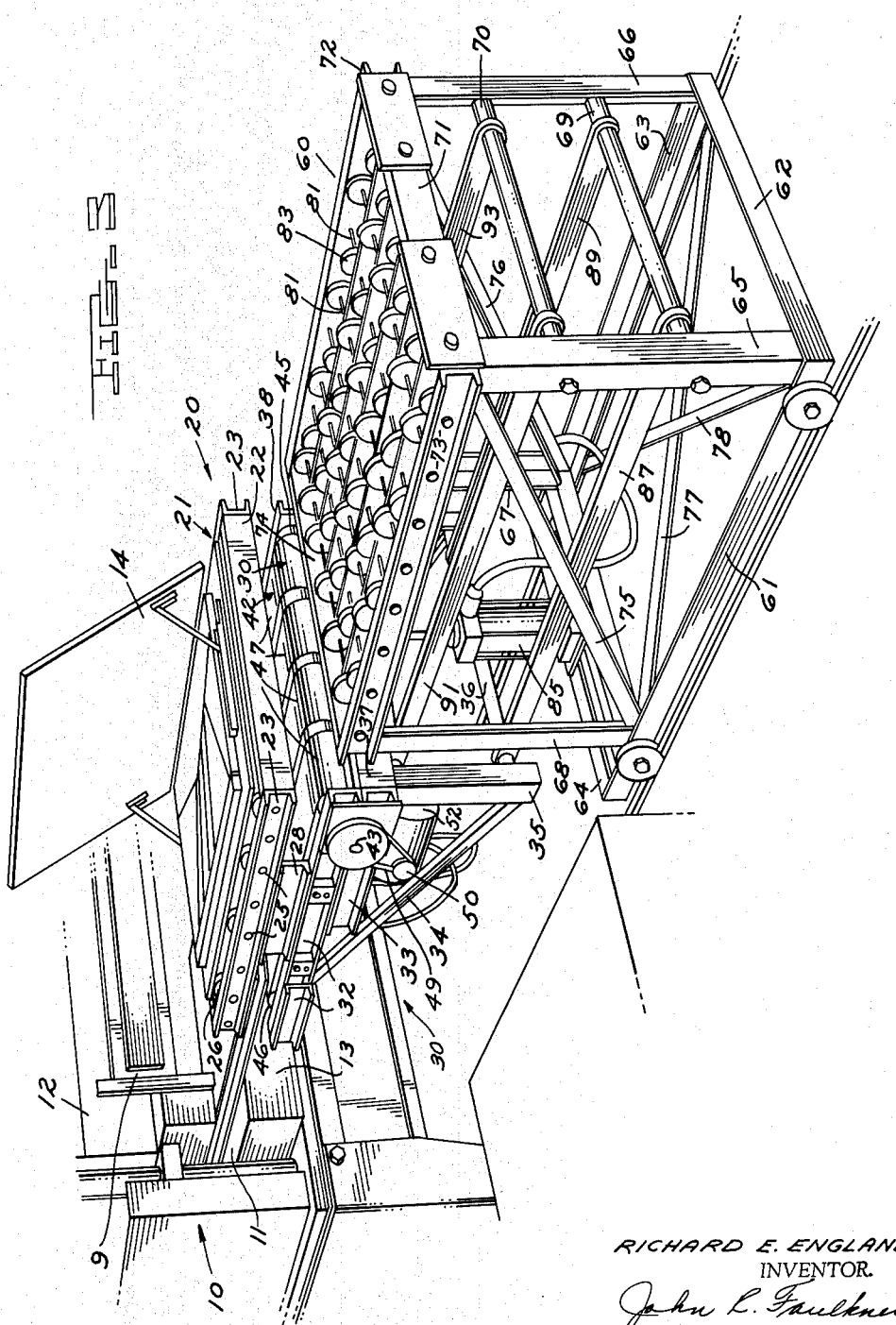

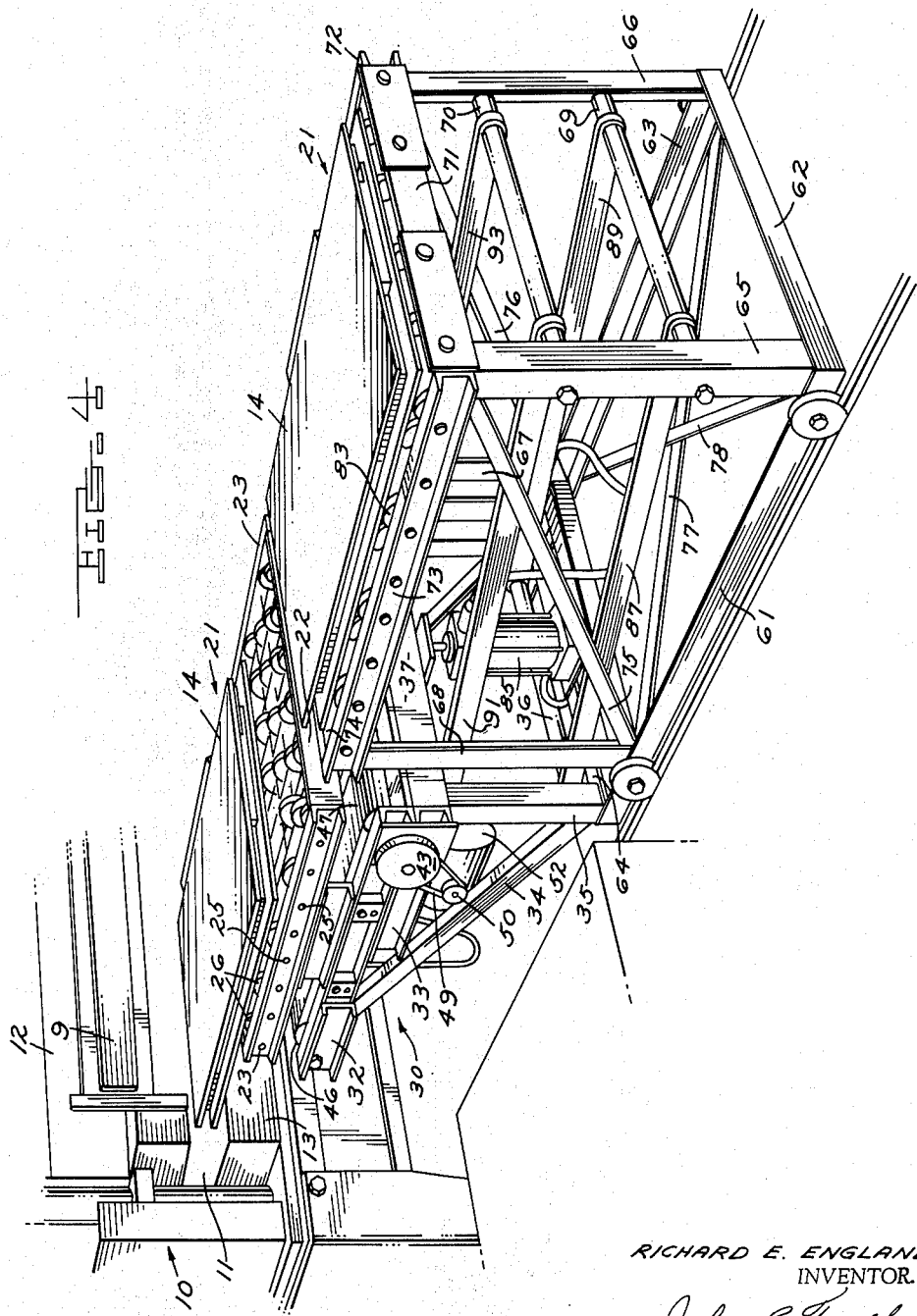

Jan. 4, 1966 R. E. ENGLAND 3,227,291
AUTOMATIC DIELECTRIC BONDING DIE EJECTION SYSTEM
Filed April 8, 1963 5 Sheets-Sheet 5
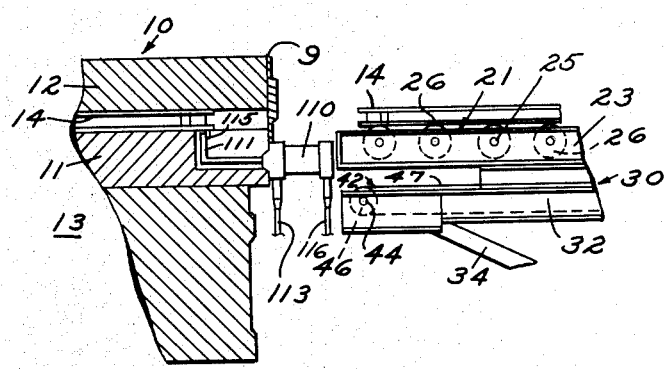
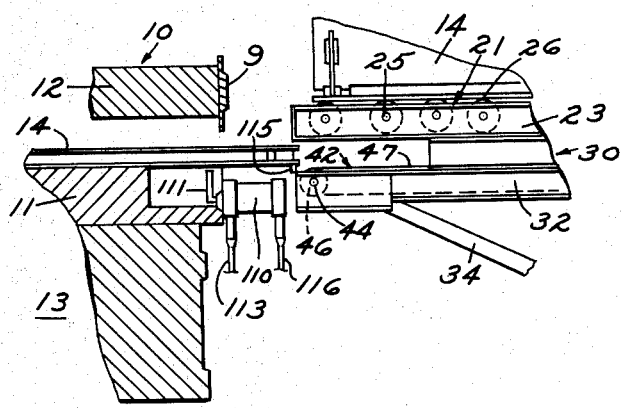
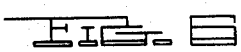
RICHARD E. ENGLAND
INVENTOR.
BY
ATTORNEYS

United States Patent Office 3,227,291
Patented Jan. 4, 1966

3,227,291
AUTOMATIC DIELECTRIC BONDING DIE
EJECTION SYSTEM
Richard E. England, Birmingham, Mich., assignor to Ford
Motor Company, Dearborn, Mich., a corporation of
Delaware
Filed Apr. 8, 1963, Ser. No. 271,388
2 Claims. (Cl. 214—1)

This invention disclosure relates to a method and apparatus for loading and unloading dies into a press and more particularly to a dielectric press. The loading and unloading of dielectric presses by automatic or semiautomatic means presents a difficult problem because of the shielding that surrounds such a press. This loading and unloading problem is further compounded by the desire to minimize the number of dies utilized so that tooling costs can be minimized.

The instant invention solves the loading and unloading problem by providing a mechanical means for facilitating the loading of the dies into the press and automatic means for unloading the dies from the press. This automatic means is adapted to move vertically so that it also serves as a loading table. In addition to automating the unloading of the dies from the press, the instant invention has the advantage of requiring only two dies, under normal conditions, to achieve full manpower and press utilization. This full manpower and machine utilization is made possible by the fact that the operator spends the majority of his time loading the dies and moving them into the machine. Though the operator output per man hour is increased considerably, the fatigue that he experiences in loading and unloading the press has been minimized by eliminating a substantial portion of the heavy manual transporting and lifting. These and other advantages of the invention will become readily apparent when the detailed description is considered in connection with the drawings wherein:

FIGURE 1 is a schematic drawing of the loading system;

FIGURES 2–4 are perspective drawings of the loading and unloading apparatus showing the sequence of operations in loading a die into the press and unloading a die from the press; and FIGURES 5 and 6 are schematic drawings showing two operational positions of the ejector.

Referring to FIGURE 1, the loading and unloading apparatus 20 is located adjacent to the press 10 that has a press or loading level 11. The press 10 may be any of the conventional presses used to form materials. In the preferred embodiment, a dielectric press is utilized. The dielectric press is different from other presses in that it has a considerable amount of shielding, such as 9, which makes loading and unloading difficult. The press 10 has a ram 12 that cooperates with the bed 13 to exert a pressure on the die 14 when placed on the bed 13. The loading and unloading apparatus 20 is located on one side of the press and adjacent to the press or loading level 11.

The loading and unloading apparatus 20 comprises a loading table 21 and an unloading means 30. The loading table 21 includes a plurality of structural members 22 and 23 fastened together by suitable fastening means such as rivets or welds to form a rectangular supporting structure. A plurality of shafts 25 are rigidly attached to the structural members 23 and adapted to rotatably support a plurality of roller members 26 that facilitate the movement of the die member 14 over the surface of the loading table 21. The loading table 21 is supported in a first horizontal plane above the unloading means 30 by a pair of angular support members rigidly attached to the support members 23, schematically shown at 28 in FIGURE 1. The angular support members 28 support the loading table 21 at a sufficient height so that the die 14 may be removed from the press and transported by the unloading means 30 beneath the loading table 21.

The unloading means 30 includes an unloading table 31 comprising the structural members 32–39 which are rigidly fastened together by suitable fastening means to form a frame or supporting structure as shown. The frame structure supports a transport or moving means such as conveyer belt means 42. The conveyer belt means comprises a plurality of shafts 43 and 44 rotatably mounted in the supporting structure and carrying the rollers 45 and 46. The rollers 45 and 46 have a plurality of endless belts 47 tightly positioned over a portion of the roller surfaces. The shaft 43 has a pulley 48 fixed thereto and drivenly engaged by the belt 49. The belt 49 is driven by the pulley 50 which is secured to the shaft 51 of the motor 52. The motor 52 is secured to the structural member 33 of the unloading means supporting structure. It is apparent that the motor 52 will drive the conveyer belts 47 via roller 45, the pulleys 48 and 50 and belt 49.

The unloading means 30 may include a storage table 60. The storage table 60 comprises the structural members 61–78 which are rigidly fastened together by suitable fastening means to form a frame or supporting structure. The structural members 72 and 73 (FIGURES 2–4) support a plurality of shafts 81. The shafts 81 rotatably support a plurality of rollers 83 which facilitate the movement of the dies across the surface of the storage table.

The structural member 64 supports a vertical positioning means such as the actuator 85 which may take the form of a hydraulic piston-cylinder arrangement. This hydraulic actuator 85 cooperates with the hinged members 87–93 (FIGURES 2–4) and the plate member 95 to support and vertically position the loading table 21 and the unloading table 30. The hinged members 87–93 are rotatably connected to the structural members 36, 39, 69 and 70 which may take the form of tubular members or shaft members. The plate member 95 is rigidly attached to the structural member 33 and pivotally attached to the piston rod 97 of the hydraulic actuator 85.

In operation the actuator 85 may move the loading table 21 and the unloading table 30 in a substantially vertical direction to an extended position. In the extended position, as shown in FIGURES 1 and 3, the unloading table 30 and the conveyer belts 47 are in line with the loading level 11 of the press whereby a die may be ejected from the bed 13 of the press onto the conveyer belts 47. The vertical positioning means or hydraulic actuator 85 is shown in its normal position in FIGURES 2 and 4. In this position, the loading table 21 is in line with the loading level 11 of the press so that a die may be rolled from the loading table 21 onto the bed 13 of the press.

It should be understood that it is within the scope of the invention to move the loading and unloading tables on vertically positioned rails rather than on hinged members. As a matter of fact, it is within the broad scope of the invention to move the loading table and unloading table by any electrical, mechanical or fluid type vertical positioning arrangement that is commonly known. While the loading table 21 and unloading table 30 are shown as being moved as a unit by a single actuator, it is within the broad scope of the invention to move the two tables independently by two separate actuators.

The loading and unloading control system is schematically shown in FIGURE 1. This system includes a fluid supply and reservoir means 100 that is connected to the hydraulic actuator 85 via the conduit 102, 103 and the solenoid valve 104. The return path from the actuator 85 to the fluid supply means 100 is formed by the conduit 106. The fluid supply means 100 is also connected to an ejector such as the hydraulic actuator 110 by the conduits 112, 113 and the solenoid 114. The return path from the ejector 110 is formed by the conduit 116. The solenoid valve 104 is controlled by a pair of normally open contacts 124 which are part of a push-button switch 120 that also includes a second pair of normally open contacts 126. The normally open contacts 124 are connected by the conductor 128 to the positive terminal of the battery 130 and are connected to the solenoid valve 104 by the conductor 132. The coil (not shown) of the solenoid valve is connected to ground point 134.

The normally open contacts 126, which in part control the operation of the ejector, are connected to the positive terminal of the battery 130 by the conductor 134 and are connected to a limit switch 136 by the conductor 137. The limit switch 136 has an operating arm 138 that cooperates with the protrusion or cam 140. This cam 140 is attached to the ram 12 of the press and is adapted to close the normally open contacts 142. When the ram 12 of the press moves upwardly, the operating arm 138 is rotated in a clockwise direction by the protrusion 140 which in turn closes the contacts 142. The closing of the contacts 142 will complete a circuit from the battery 130 to the solenoid 114 and to the ground point 144, assuming the normally open contacts 126 are closed.

In operation the depression of the push-button switch 120, as shown in FIGURE 1, would complete a circuit from the battery 130 to the solenoid valve 104 thereby permitting the fluid reservoir and supply means 100 to supply fluid to the hydraulic actuator 85. This would cause the hydraulic actuator 85 to be moved to a vertical position aligning the unloading table 30 with the loading level 11 of the press. The depression of the push-button switch 120 would also close the normally open contacts 126. This would only complete a circuit to the solenoid valve 114 when the ram 12 of the press has moved upwardly. Assuming the limit switch 136 had been operated by the upward movement of the ram 12, the solenoid 114 would be energized when the push button 120 was depressed causing the ejector 110 to be operated and moved from the position shown in FIGURE 1 or 5 to the position shown in FIGURE 6. This movement of the ejector 110 causes the die that is in the press to be moved onto the conveyer belts 47. It should be noted that the ejector 110 has an arm 111 which cooperates with a lug 115 on the die to propel the die sufficiently so that it is moved onto the conveyer belts 47. The lug 115 is positioned to ride in one of the gaps between the plurality of belts 47. The conveyer belts 47 then transport the die 14 away from the press and onto the storage table 60.

It should be understood that while the control system disclosed has been an electrical-fluid type of system, it is within the broad scope of the invention to make the system electrical, electronic, fluid or any combination thereof.

The FIGURES 2–4 show the sequence of operation of a die being embossed, loaded into the press and unloaded from the press. In FIGURE 2 a first die is in the press being formed and embossed while a second die is on the loading table. With the second die on the loading table, the operator depresses the push-button switch 120 which raises the unloading table 30 to the loading level and raises the loading table 21 to a position closer to the operator to facilitate the loading of the die. This position is shown in FIGURE 3. When the embossing of the material in the first die is complete, the press will move upwardly and the protrusion 140 will close the limit switch 136 resulting in the ejector moving the first die from the press and onto the conveyer belts 47. The conveyer belts transport the first die rearwardly to the storage table 60. When the loading of parts into the second die is completed, the operator may open the push-button switch 120 whereby the loading table will move downwardly to its normal position in line with the loading level of the press. This position is shown in FIGURE 4 with the second die loaded with parts and about to be inserted into the press. The first die will then be positioned on the loading table and the above-described sequence of operations will be repeated.

It should be understood that while only a single loading and unloading device has been disclosed as cooperating with the press, it is well within the broad scope of the invention to employ loading and unloading devices on more than one side of the press. The need for additional loading and unloading devices will, of course, depend upon the period required to form the material in the press as compared to the period required to load the die. It should be observed that a single loading and unloading device has all its parts located on one side of the press. This enables one operator to perform all of the necessary operations. It should also be noted that usually only two dies are required to maintain the loading and unloading system in operation. This system, in experimental operation, has increased productivity as much as twenty percent and has considerably lessened the fatigue of the operators.

It will be understood that the invention is not to be limited to the exact construction shown and described and that various changes and modifications may be made without departing from the spirit and scope of the invention, as defined in the appended claims.

What is claimed is:

1. In a loading and unloading mechanism for a press having a press loading level adapted to receive a die, the combination comprising a loading table having a loading surface supported on one horizontal plane, a storage table, an unloading means including a conveyor belt at another horizontal plane for transporting said die away from said press onto said storage table, said loading table and said unloading means being one integral unit located on one side of said press, said storage table being maintained at the same level as the press loading level and being located adjacent said integral unit on the side opposite of said press, and an ejector means for removing said die from said press and onto said conveyor belt, and vertical positioning means for moving said loading table and said unloading means as a unit in a vertical direction, said vertical positioning means being adapted to alternately align said loading table and said unloading means with the loading level of said press, whereby said die may be loaded from said loading table into the press and unloaded from the press onto said conveyor belt.

2. The loading and unloading mechanism of claim 1 and which is further characterized in that said ejector means is operative when said conveyor belt is aligned with said press loading level.

References Cited by the Examiner

UNITED STATES PATENTS

| | | | |
|---|---|---|---|
| 427,459 | 5/1890 | Chamberlain. | |
| 2,547,329 | 4/1951 | Lapham | 214—514 |
| 2,730,251 | 1/1956 | Schutt | 214—152 |
| 2,818,189 | 12/1957 | Schreck | 214—514 |
| 2,940,619 | 6/1960 | Schramm | 214—16.4 X |
| 3,067,893 | 12/1962 | Grove | 214—514 |
| 3,071,266 | 1/1963 | Pries | 214—152 |
| 3,090,498 | 5/1963 | Palmer. | |
| 3,091,347 | 5/1963 | Sehn. | |

FOREIGN PATENTS 1,309,161  10/1962  France.

MARVIN A. CHAMPION, *Primary Examiner.*

HUGO O. SCHULZ, *Assistant Examiner.*